United States Patent [19]

Rasmussen

[11] Patent Number: 4,629,525

[45] Date of Patent: Dec. 16, 1986

[54] METHOD AND APPARATUS FOR PREPARING A HIGH STRENGTH SHEET MATERIAL

[76] Inventor: Ole-Bendt Rasmussen, Forchwaldstrasse 23, Walchwil/Zug, Switzerland, CH 6318

[21] Appl. No.: 557,125

[22] PCT Filed: Mar. 25, 1983

[86] PCT No.: PCT/DK83/00038

§ 371 Date: Nov. 18, 1983

§ 102(e) Date: Nov. 18, 1983

[87] PCT Pub. No.: WO83/03381

PCT Pub. Date: Oct. 13, 1983

[30] Foreign Application Priority Data

Mar. 26, 1982 [DK] Denmark .............................. 1398/82

[51] Int. Cl.$^4$ ............................................. B32B 31/14
[52] U.S. Cl. ........................................ 156/84; 156/85; 156/87; 156/200; 156/229; 156/244.11; 156/244.24; 156/494; 156/500; 264/289.6; 264/290.2; 264/176.1
[58] Field of Search ................ 156/87, 84, 85, 244.11, 156/244.24, 200, 210, 229, 494, 500; 264/176 R, 177 R, 288.4, 288.8, 289.6, 290.2, 291; 425/131.1, 133.1

[56] References Cited

U.S. PATENT DOCUMENTS 3,484,916 12/1969 Johnstone .................. 264/289.6
3,539,439 11/1970 Calderwood et al. ......... 156/244.24
4,039,364 8/1977 Rasmussen ........................ 156/164
4,116,892 9/1978 Schwarz .......................... 264/289.6
4,415,523 11/1983 Barham et al. ................... 264/289.6
4,426,343 1/1984 Vittone et al. ................... 264/290.2
4,496,413 1/1985 Sharps ............................ 156/244.14

Primary Examiner—Caleb Weston
Attorney, Agent, or Firm—William J. Daniel

[57] ABSTRACT

A method of preparing a high strength sheet material comprising (a) forming a laminate comprising at least two layers of a thermoplastic polymer material, each layer having a fibrillar grain structure providing a predominant direction of splittability in each said layer, and wherein the layers are bonded to one another with the said predominant directions of splittability generally transverse to each other, (b) biaxially orienting the molecules of said layers by stretching the layers in substantially uniaxial steps, at least the transverse stretching step thereof being effected by applying pressure to the surface of the laminate along lines extending substantially in the longitudinal direction of the laminate to impart thereto a transversely waved or sinuous configuration, and (c) subjecting the biaxially oriented laminate while in the sinuous condition to a heat treatment while allowing at least 7% shrinkage of the laminate to take place in at least its transverse direction. The sinuously configured laminate is preferably brought into contact with a heated body having a surface that is flat in a transverse direction so that the crests on the sides of the sinuous configuration adjacent said body are heated more rapidly than the remainder of the laminate.

32 Claims, 3 Drawing Figures

METHOD AND APPARATUS FOR PREPARING A HIGH STRENGTH SHEET MATERIAL

This invention relates to a method of preparing a high strength sheet material comprising forming a laminate comprising at least two layers of a thermoplastic polymer material, each layer having a fibrillar grain structure providing a predominant direction of splitability in said layer, the layers being bonded to one another with the said predominant directions of splittability transverse to each other, and biaxially orienting the molecules of said layers by stretching the layers in substantially uniaxial steps, the transverse stretching being effected by applying pressure to the surface of the laminate along lines extending substantially in the longitudinal direction of the laminate to impart thereto a waved configuration.

British patent specification No. 1.526.722 describes the manufacture of a laminate by a method comprising extruding at least two layers, each consisting of a blend of polymers which are incompatible to such a degree that the blend on solidification forms a dispersion of particles of one polymer in a polymeric matrix melt, attenuating each layer to obtain a fibrillar grain structure having a predominant direction of splittability after solidification into a film, bonding the two layers to one another with the predominant directions of splittability transverse to one another and biaxially stretching the solidified laminate in substantially uniaxial steps, the stretching being conducted at a temperature sufficiently low to maintain the predominant direction of splittability in each layer.

The specification of British Pat. No. 1.526.724 describes the manufacture of a laminate comprising at least two films of a polymeric material by a method which comprises pressing the film together along lines extending substantially in the longitudinal direction of the films and simultaneously stretching the films in the transverse direction, thereby forming a laminate having a waved or sinuous configuration in its transverse direction.

The latter method may advantageously by utilized to bond the two layers together and to effect the transverse stretching of the laminate in the method described in the British patent specification No. 1.526.722. However, the laminates thus produced ordinarily exhibit longitudinal striations which impart to the laminate thickness variations in the transverse direction and consequently an unsatisfactory rigidity, low temperature tear strength and sealability.

The object of the invention is to provide a laminate having an improved rigidity, an improved low temperature tear strength and improved sealability.

Another object of the invention is to provide a laminate which is suitable for use in the manufacture of heavy duty sacks or bags, e.g. sacks for Portland cement.

A further object of the invention is to provide a laminate having an increased yield point and improved anti-creep properties.

These objects and other objects which will become clear from the following description are obtained by the invention.

According to a first aspect of the invention there is provided a method of the above mentioned type which method comprises the additional step of subjecting the biaxially oriented laminate to a heat treatment while allowing at least 7% shrinkage of the laminate to take place in at least its transverse direction.

This aspect of the invention is based on the discovery that the relatively thin zones of the transversely stretched laminates are overstretched and that the material in these zones exhibit a pronounced tendency to contract when heated to an elevated temperature. Consequently, variations in the thickness of the laminate tend to be reduced or almost eliminated during such a heat treatment.

It is preferred to effect a shrinkage of at least 12% in the transverse direction.

The heat treatment may be effected in an oven but in practice it is preferably effected by contacting the laminate with the surface of a heated body because the transverse contraction of the laminate will then occur under more controlled conditions. The heated body is preferably a heated roller.

In order to reduce the friction between the laminate under contraction and the heated body and thus permit the transverse contraction to occur almost entirely even over the width of the laminate, the heat treatment is advantageously effected by contacting a longitudinally pleated laminate with a heated roller. It should be mentioned that a transverse contraction of the laminate may take place after it has left the heated roller but the spontaneous tendency to contract is most pronounced at the start of the heat treatment, i.e. while the laminate is in contact with the heated roller.

If the transversely stretched waved laminate is allowed to expand due to its inherent elastic recovery properties before it is subjected to the heat treatment, irregular pleats may be formed and consequently the thermally induced transverse contraction also becomes irregular. Therefore, it is preferred to introduce the laminate onto the heated roller while it still has the waved configuration obtained during the last transverse stretching step. The laminate preferably is allowed to contract longitudinally during such last transverse stretching step. This effect is achieved by keeping a low tension while feeding the laminate into the last transverse stretching device (usually a pair of grooved rollers).

This longitudinal contraction improves puncture and tear strength and further improves the form stability of the final product.

When the means for transversely stretching the laminate comprise at least one pair of intermeshing grooved rollers, one or more conveyor rollers are preferably arranged between the last pair of intermeshing grooved rollers and the heated roller, the adjacent rollers in the assembly being in so close proximity to one another that the film is supported by a roller surface during substantially all of its travel from the last pair of grooved rollers to the heated roller.

The transverse contraction should preferably be combined with a longitudinal contraction and such longitudinal contraction should be as complete as possible at the annealing temperature used. Therefore, the longitudinal tension in the laminate should preferably be adjusted to a minimum at its introduction onto the hot roller and at the take-off from the hot roller or rollers.

However, when a pleated laminate contacts the hot roller under low tension, air bubbles may be entrapped between the laminate and the roller surface and such air bubbles may lead to an uneven shrinkage.

In a preferred embodiment of the method of the invention such entrapped air bubbles are removed by squeezing while allowing the laminate to slide along the surface of the hot roller. This can be achieved in a simple manner by lightly pressing, e.g. by means of a counter roller, the laminate against the surface of the hot roller. More efficiently, however, the entrapped air bubbles are removed by subjecting the laminate to vibrations comprising short intervals during which the laminate is forced against the surface of the hot roller, e.g. by means of a counter roller which is oscillating relative to the hot roller.

The counter roller is preferably one of the above mentioned transfer rollers.

A second aspect of the invention relates to a particularly advantageous combination of material composition, stretching conditions and a heat treatment.

The method according to this aspect comprises forming a laminate comprising at least two layers of a thermoplastic polymer material, each layer having a fibrillar grain structure providing a predominant direction of splittabiity in each of said layers, the layers being bonded to one another with the said predominant directions of splittability transverse to each other, and biaxially orienting the molecules of said layers by stretching the layers in substantially uniaxial steps, wherein the thermoplastic polymer material consists of a blend of 40-85% by weight of polypropylene and 60-15% by weight of a lower melting or amorphous admixture which (a) mainly consists of polyethylene incl. copolymers thereof, (b) exhibits substantially the same or a higher elongation at break than the polypropylene when tested at room temperature under slow stretching, (c) has a modulus of elasticity which at room temperature is equal to or lower than that of a blend of 90% polyethylene of a density of 0.95 and 10% EPR containing 25% ethylene and 75% propylene, wherein at least the last 25% of the biaxial stretching, measured on the area increase, is carried out below 50° C., and wherein the biaxially oriented laminate is subsequently heat treated at a temperature higher than 50° C., preferably at least 70° C.

By the extrusion of the base films for the laminate, the polypropylene will crystallize (as established by electron microscopy) in the form of fibrils having a diameter of from about 0.05 to 2 microns, while the softer polymeric admixture will form a coating on and embedment for these stiffer fibrils. It is well known that polypropylene begins to recrystallize at 50°-60° C., whereby the stiffness of the fibrils generally increases. In the combination defined above this stiffening is highly advantageous.

The feature that biaxial stretching (or at least the last part thereof) is carried out at a lower temperature even though the stiffening of the fibrils is desirable, might appear to be an unnecessary complication, but in actual fact this sequence of steps has been found to be very advantageous.

Similar to what is described in connection with the first aspect of the invention, the heat treatment should preferably be carried out under such conditions that at least 7% shrinkage of the laminate takes place in at least its transverse direction, and it should generally be aimed at a higher shrinkage, such as 12% or more.

The use of the special transverse stretching method described as the first aspect of the invention is also advantageous.

Similar to what is well known from high-strength cross-laminates made from uniaxially oriented films, the molecular weight is important as far as the strength is concerned, and generally the melt flow index of the polypropylene should not exceed 1 according to ASTM D 1238 condition L. However, if the molecular weight distribution is particularly even, melt indices up to about 3-4 can be used with good result.

The stretch ratio should preferably not exceed 2.5:1 in any direction, and the optimum ratio is usually between 1.3-1.9, depending on the final use of the laminate. These values refer to the state when shrinkage has taken place (if shrinkage has been effected).

In a preferred embodiment of this second aspect of the invention the admixture comprises as its major component linear polyethylene. While for instance a highly branched polyethylene is less suitable, i.a. due to the fact that its elongation at break at room temperature is substantially lower than that of polypropylene, it has been found that the use of linear polyethylene in such admixture cooperates synergistically with the embedded fibrils of polypropylene (in the stretched and heat treated condition, as defined) to provide particularly advantageous mechanical properties. Furthermore, it has been found that the low stiffening temperature of polyethylene improves the low temperature performance of the laminate to a surprising extent, such that the very pronounced stiffening of polypropylene at temperatures below about 0° C. in this case generally becomes an advantage rather than a disadvantage for the mechanical properties of the laminate. In this connection it is important that the admixture which remains soft at the low temperatures is not occluded but on the contrary forms embedment for the stiff polypropylene fibrils.

The linear polyethylene in this embodiment of the invention preferably is high density polyethylene of a melt index according to ASTM D 1238 condition L not exceeding 0.2 and the admixture further comprises a softening component, preferably an elastomer.

Alternatively, the linear polyethylene can be low density linear polyethylene. Generally, its melt flow index (ASTM D 1238, condition E) should not exceed 5, and much lower melt flow indices are preferable.

High molecular weight linear low density polyethylene, i.e. of a melt index not exceeding 0.2 (ASTM D 1238 condition L) is particularly advantageous.

The designation "linear low density polyethylene" or "LLDPE" refers to polyethylene which is branched in controlled manner to achieve a high elongation at break. This controlled branching, as known, can be established, either by a high-pressure polymerization by using a suitable catalyst, or by copolymerization with a suitable branch-forming monomer, such as butene, pentene, hexene or octene, of which the latter is preferable in connection with the present invention.

Advantageously, the polyethylene is selected so that its shrinkability at 100° C., in the oriented state, is higher than the corresponding shrinkability of the polypropylene.

Under these circumstances, a special morphology will result. This morphology is characterized by twists or waves on the polypropylene fibrils with a twist or wave length of the order of 1 micron which can be observed in a scanning electron microscope.

The mechanical state of this structure has some similarity to cement which is reinforced with prestretched iron.

A third aspect of the invention relates to the manufacture of a laminate having properties which make the material particularly useful for the manufacture of heavy duty sacks.

The method according to this aspect comprises forming a laminate comprising at least two layers of a thermoplastic polymer material, each layer having a fibrillar grain providing a predominant direction of splittability in each such layer, the layers being bonded to one another with such predominant directions of splittability transverse to each other, and biaxially orienting the molecules of said layers by stretching the layers in substantially uniaxial steps, and the method is characterized in that the direction of splittability of each layer of the layers of the laminate to be biaxially oriented forms an angle of between 10° and 35° C. with the machine direction of the laminate.

A sack usually has a width which is much smaller than its length and has been made in such a manner that the machine direction of the thermoplastic film corresponds to the length direction of the sack. During filling of the sack and ordinary handling of the filled sack, the most important performance factor is the yield point in its longitudinal direction. In case the filled sack is dropped, the most important performance factors are tear propagation strength, puncture strength and impact strength, the latter under forces which mainly act in the transverse direction of the sack.

It might be assumed that a laminate in which the direction of splittability of each layer is lying relatively close to the machine direction would be weak because a rupture (formed by puncturing or snagging) might easily propagate under the influence of these transversely acting forces.

The fact, however, is that the opposite is true, namely that the laminate thus produced generally exhibits an advantageous tear propagation resistance in all directions, particularly in the directions which form an angle of 45° to the machine direction. The tear propagation resistance in these directions has been found determining for the strength of a stitched seam in cross laminated film material, such as a sewn sack.

An additional advantage obtained relates to the formation of hot seals in the manufacture and/or closing of the sack.

While the laminate can readily be formed into a tube with a glued or heat-sealed longitudinal seam having overlapping edges and a relatively low peel strength is sufficiently in such type of seam, it is complicated and expensive to fold the material to form overlapping edges at the bottom and/or at the top of the sack. Consequently, there is an important practical need for a high-strength film which readily can be heat-sealed to itself to form seams across its machine direction with a resulting high peel strength.

One measure useful in this connection is the choice of a suitable surface layer on the laminate.

Another measure is the allowance of a substantial contraction of the laminate perpendicular to a seam that is parallel to the length of the sack, so that the increased thickness can compensate for the loss of molecular orientation caused by the hot-sealing. At the same time it is essential to limit the contraction of the laminate parallel to a direction of the seam which is perpendicular to the length of the sack.

It has been now found that the melt orientation of the polymer molecules produced in connection with the extrusion (as distinguished from the subsequent biaxial orientation at a much lower temperature) plays a very important role for the contraction during heat sealing, and that consequently the use of relatively small angles between the machine direction and the directions of splittability (substantially coinciding with the direction of melt orientation) leads to substantially improved heat seals at the top and/or the bottom of the sack, in particular with respect to the impact actions resulting when a filled sack is dropped.

In this third aspect of the invention a heat treatment subsequent to the biaxial stretching is also highly preferable and similar to what is described in connection with the first aspect of the invention, the heat treatment should preferably be carried out under such conditions that at least 7% shrinkage of the laminate takes place in at least its transverse direction and it should generally be aimed at a higher shrinkage, such as 12% or more.

The use of the special transverse stretching method in connection with the first aspect of the invention is also advantageous. The stretch ratio should preferably not exceed 2.5:1 in any direction and the optimum ratio is usually between 1.3–1.9, depending on the final use of the laminate. These values refer to the state when shrinkage has taken place (if shrinkage has been effected).

In the practice of this third aspect of the invention, the choice of polymers and heat treatment which are disclosed above in connection with the second aspect of the invention are also advantageously used.

Furthermore, this third aspect may advantageously be used in connection with the production of laminates produced in accordance with claims 22 and 23 of the above mentioned British patent specification No. 1.526.722. According to these claims one unoriented two-ply laminate in which the layers exhibit criss-crossing directions of splittability is produced directly by coextrusion, using rotating die-parts. It has now been found that the properties of the final biaxially oriented laminate produced on the basis of this coextrusion method is substantially improved when the angles between the directions of splittability of each layer and the machine direction fall within the range 10°–35°.

A fourth aspect of the invention relates to an advantageous material composition which in particular exhibits a high low temperature performance and which is readily stabilized against ultra-violet light.

The method according to this fourth aspect of the invention comprises forming a laminate comprising at least two layers of a thermoplastic polymer blend comprising polyethylene, each layer having a fibrillar grain structure providing a predominant direction of splittability in each such layer, the layers being bonded to one another with the predominant directions of splittability transverse to each other, and biaxially orienting the molecules of the layers by stretching the layers in substantially uniaxial steps to convert the grain of polymer into a zig-zagging micropattern, said blend being composed of high molecular weight high density polyethylene and low density polyethylene having significantly lower molecular weight, said low density polyethylene being selected from the group of copolymers and/or branched polyethylenes which (a) exhibit substantially the same or higher elongation at break than the high molecular weight high density polyethylene when tested at room temperature under slow stretching, (b) are capable of distinctly segregating, while forming a distinct microphase, from said high molecular weight high density polyethylene on cooling of a molten homogeneous blend of the said components.

The term "High molecular weight high density polyethylene" ("HMHDPE") comprises HDPE having a melt flow index of about or lower than 0.2 according to ASTM D 1238, condition E.

As regards the low density polyethylene, it may advantageously be LLDPE (see explanation of this term above).

By the combination of polymers which chemically are so closely related and blend homogeneously in the melt but still, i.a. due to the different molecular weights, clearly segregate from each other on cooling, one obtains a particularly fine and regular grain of polymer consisting of highly crystalline and relatively stiff microfibrils in a less crystalline and softer matrix. This structure has been observed in an electron microscope after selectively dissolving the matrix material. As mentioned above the grain thus produced was particularly regular and the distance between adjacent fibrils (from centre to centre) was in the order of magnitude 1/10.000 mm (1/10 $\mu$m). The regular and fine structure, and the good bonding between the stiffer fibrils and softer matrix is of importance as far as the strength properties are concerned. The crystalline nature of the soft matrix gives the material low tendency to coldflow.

The blending ratio between the HMHDPE and the LDPE (preferably LLDPE) may conveniently be in the range of from 25:75 to 75:25.

HMHDPE exhibits a high tendency to molecular melt orientation. Such melt orientation (except when weak) generally has been found a drawback in connection with the present invention. In this connection one must distinguish between the morphological "orientation" (grain of polymer) which is essential in the present invention, and the molecular melt orientation, which i.a. reduces the elongation of break and thereby the energy absorption.

Therefore, it is advisable to use low air cooling at the exit of the extruder so that the molecular melt orientation can be practically minimized.

Further improvements in this respect, and other essential improvements, can be obtained when the blend further contains polypropylene of a molecular weight significantly lower than said high molecular weight high density polyethylene.

During draw-down at the exit from the extrusion die the HMHDPE will be molecularly oriented and will thereby "carry" the film, so that the polypropylene is protected against any strong molecular orientation, and after crystallization of the polypropylene the latter will "carry" the film so that the HMHDPE has the opportunity to loose part of its molecular orientation again.

The ratio in the blend between the polypropylene and the HMHDPE+LDPE can conveniently be in the range of between 0 and 70/30.

The blend may further contain minor amounts of an alloying agent, e.g. a copolymer of propylene and a polyolefin with 4 or more carbon atoms.

Similar to what is stated above in connection with the second and third aspect of the invention, the film sheet is preferably allowed to shrink at least 7% in at least one direction, and the stretch ratio in any direction and determined after shrinkage preferably does not exceed 2.5:1.

High-strength laminates manufactured according to this fourth aspect of the invention can conveniently be made with the angles and other features described under the third aspect.

Finally, a fifth aspect of the invention concerns the conservation of the correct amount and kind of bonding between the cross-laminated films, even after a strong heat-treatment.

The method according to the fifth aspect comprises forming a laminate from at least two separately extruded films of thermoplastic polymer material, each film comprising (a) a main layer exhibiting a fibrillar grain structure providing a predominant direction of splittability in each said film, and (b) a second layer for controlling bonding strength, the films being bonded to one another with the said predominant directions of splittability transverse to each other, the second layer of one film facing the second layer of the other film, and biaxially orienting the molecules of these layers by stretching the layers in substantially uniaxial steps, the transverse stretching and the bonding being effected by applying pressure to the surface of the laminate along lines extending substantially in the longitudinal direction of the laminate to impart thereto a waved configuration, and in which main layers the fibrillar grain structure consists of highly crystalline polypropylene and/or high density polyethylene micro fibrils which are generally embedded in a matrix material predominantly consisting of low density polyethylene, and preferably (a) such matrix material exhibits an elongation at break similar to or higher than that of the fibriloforming polypropylene or high density polyethylene when tested at room temperature under slow stretch, and (b) the second layers mainly consist of branched polyethylene and exhibit a heat-seal temperature higher than 100° C. and an elongation at break similar to or higher than that of fibrilforming polypropylene or high density polyethylene.

The branched polyethylene for the second layer preferably is LLDPE, to which there should usually be added about 35% or less of an elastomer, such as ethylene-propylene rubber. The matrix material may also conveniently be based on LLDPE.

When the laminate so produced is heated up to about 100° C.—either by a regular heat treatment as described e.g. under the first aspect of this invention, or because hot goods (e.g. hot cement) is packed in the laminate or in sacks made therefrom, the bonding strength will be maintained at the correct, not too high level, which is essential for the achievement of a high tear-propagation resistance.

It is preferred to heat treat the laminate below the temperature at which the second layers heat-seal to each other. The matrix material used preferably has a melting range lower than that of the second layer and the laminate is allowed to shrink, at least in one direction, during heat treatment.

The extruded films from which the laminate is produced may further comprise a surface layer which facilitates sealing of the laminate. The said layer can with advantage consist of plain or almost plain lineary low density polyethylene.

The invention also relates to an apparatus for carrying out the method according to the first aspect of the invention. The apparatus of the invention comprises means for preparing a laminate and means for stretching that laminate in substantially uniaxial steps, the means for transversely stretching the laminate comprising means for applying pressure to the surface of the laminate along lines extending substantially in the longitudinal direction of the laminate to impart thereto a waved configuration, and the characteristic feature of the apparatus is that it further comprises means for heat treating the biaxially oriented laminate while allowing a shrinkage of the laminate to take place in at least its transverse direction.

The means for preparing the laminate are preferably those described in British patent specification No. 1.526.722 and the means for transversely stretching the laminate are preferably those disclosed in British patent specification No. 1.526.724.

As mentioned above the heating means preferably consist of a heated roller and the apparatus of the invention preferably comprises means for introducing the laminate onto said heated roller in a longitudnally pleated configuration.

The latter means may be a separate pleating device but in case a waved configuration has been imparted to the laminate by means of a pair of intermeshing grooved rollers of the type described in British patent specification No. 1.526.724, it is preferred to place the heated roller in close proximity of the surface of one of the rollers of this pair of intermeshing grooved rollers to allow the laminate to be contacted with the surface of said heated roller immediately after having left the surface of said roller of the pair of intermeshing grooved rollers.

In this manner the fine waved configuration of the laminate is maintained during its travel from the pair of intermeshing rollers to the heated roller and the contracted laminate resulting from the following heat treatment exhibits very useful strength properties.

In an apparatus in which the means for transversely stretching the laminate comprise at least one pair of intermeshing grooved rollers, one or more conveyor rollers are preferably arranged between the last pair of intermeshing grooved rollers and the heated roller, the adjacent rollers in the assembly being in such close proximity to one another that the film is supported by a roller surface during substantially all of its travel from the last pair of grooved rollers to the heated roller.

BRIEF DESCRIPTION OF THE DRAWINGS

FIG. 2 is a diagram showing the effect on laminates produced according to the invention of variations in the annealing temperature thereof; while

The invention will be further described with reference to FIG. 1 of the drawings which schematically illustrates an apparatus for effecting the transverse stretching and heat treatment steps of the method of the invention.

Figure 1:
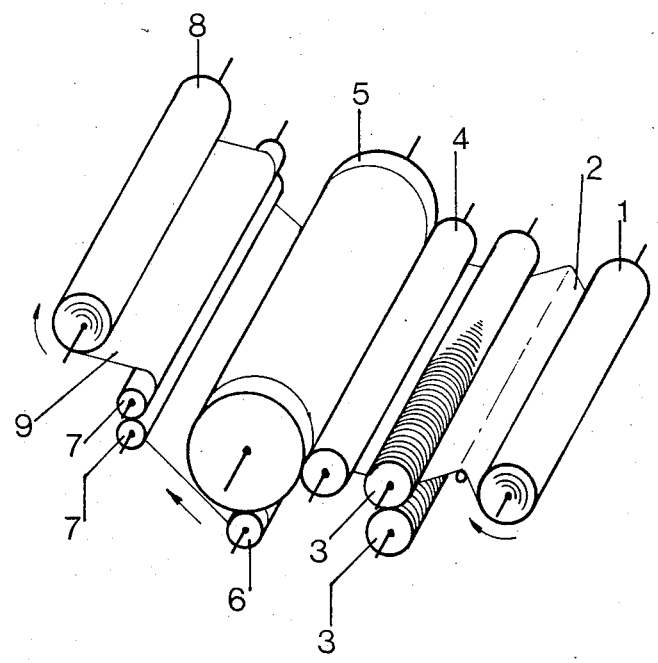
FIG. 1 is a diagrammatic view in perspective of an arrangement of an apparatus for carrying out the method of the present invention.

FIG. 1 illustrates a roll 1 of a laminate 2, and 3 is a set of grooved rollers. The set of grooved rollers 3 are mounted adjacent to an oscillating roller 4 mounted so close to a hot roller 5 that the laminate 2 is pressed against the surface of the hot roller 5 during short intervals. A cooling roller 6 is also mounted adjacent to the heated roller. The apparatus further comprises a set of take-off rollers 7 and a roll 8 of transversely stretched and heat treated laminate 9.

The operation of the apparatus illustrated is as follows:

Laminate 2 is unwound from the roll 1 and is passed through the nip of the set of grooved rollers 3 in which the laminate is stretched in its transverse direction and deflected so as to impart thereto a waved or sinuous configuration. Following the transverse stretching the laminate is contacted with the oscillating roller 4 and subsequently contacted with the hot roller 5. Due to the oscillating movement of the roller 4 relative to the hot roller 5 the heated laminate is free to shrink longitudinally. After leaving the hot roller 5 the laminate is cooled on cooling roller 6 and is subsequently wound so as to form a roll 8 after having passed through the nip of the set of take-off rollers 7.

The invention will now be described in further detail with reference to the following examples.

EXAMPLE 1

A series of 3-layered tubular films are extruded. Each film has a main layer in the middle, a layer for improved heat sealing on one surface and a layer for improved lamination on the other surface. The three layers form 75%, 15% and 10%, respectively, of the total film.

The main layer consists of a blend (intimately preblended in a planetary screw extruder) of (1) a socalled "block-copolymer" of propylene and ethylene sold under the trade name "Hostalen 1022", (2) an ethylene-propylene rubber sold under the trade name "Nordel 1500", (3) a high molecular weight high density polyethylene sold under the trade name "Hostalen 9255 F".

Component 1 has melt flow index of 0.4 according to ASTM D 1238 condition L and analysis shows that it contains about 80% homo-polypropylene, about 10% polyethylene and about 10% ethylenepropylene rubber. A true block-copolymer is hardly detectable by the analysis, but it is very likely that there are undetectable segments of polyethylene on the polypropylene which segments assist in forming a good polymer-in-polymer dispersion.

Component 2 contains about 20% ethylene and exhibits some ethylene crystallinity and a melt index of about 0.3 measured at 190° C. but otherwise under the same conditions as in the above mentioned ASTM specification (i.e. at "condition E" instead of "condition L").

Component 3 has a density about 0.95 and melt index of about 0.05 measured under the same conditions as component 2.

The blending ratios appear from the following table 1:

TABLE 1

| Sample | Code and remarks | PP- "copolymer" % | True PP % | EPR. admixed % | True EPR. % | HMW. HDPE. admixed % | True PE. % | Final stretch ratio (after shrinkage, if shrunk) | | Annealing temperature °C. | Shrink ratio % | |
|---|---|---|---|---|---|---|---|---|---|---|---|---|
| | | | | | | | | MD | CD | | MD | CD |
| a. | 245,1 | 90 | 72 | 10 | 19 | 0 | 9 | 1,50:1 | 1,50:1 | (35) | | |
| b. | 245,80 | 90 | 72 | 10 | 19 | 0 | 9 | 1,38:1 | 1,38:1 | 80 | 20 | 16 |
| c. | 247,1 | 75 | 60 | 10 | 17 | 15 | 23 | 1,44:1 | 1,56:1 | (35) | | |
| d. | 247,80 | 75 | 60 | 10 | 17 | 15 | 23 | 1,44:1 | 1,36:1 | 80 | 16 | 12 |
| e. | 255,1 | 65 | 52 | 10 | 16 | 25 | 32 | 1,46:1 | 1,54:1 | (35) | | |

TABLE 1-continued

| | | | | | | | | | | | |
|---|---|---|---|---|---|---|---|---|---|---|---|
| f. | 255,80 | 65 | 52 | 10 | 16 | 25 | 32 | 1,36:1 | 1,36:1 | 80 | 16 | 15 |
| g. | 257,1 | 45 | 36 | 10 | 14 | 45 | 50 | 1,54:1 | 1,50:1 | (35) | | |
| h. | 257,80 | 45 | 36 | 10 | 14 | 45 | 50 | 1,34:1 | 1,44:1 | 80 | 18 | 21 |
| i. | 258,1 4-laget | 45 | 36 | 10 | 14 | 45 | 50 | 1,60:1 | 1,60:1 | (35) | | |
| j. | 258,80 4-laget | 45 | 36 | 10 | 14 | 45 | 50 | 1,42:1 | 1,44:1 | 80 | 18 | 16 |
| k. | 255,13 45° narv | 65 | 52 | 10 | 16 | 25 | 32 | 1,64:1 | 1,64:1 | (35) | | |
| l. | 255,803 45° narv | 65 | 52 | 10 | 16 | 25 | 32 | 1,46:1 | 1,40:1 | 80 | 18 | 16 |
| m. | 255,50 | 65 | 52 | 10 | 16 | 25 | 32 | 1,60:1 | 1,50:1 | 50 | 8 | 9,6 |
| n. | 255,60 | 65 | 52 | 10 | 16 | 25 | 32 | 1,56:1 | 1,46:1 | 60 | 12 | 11 |
| o. | 255,70 | 65 | 52 | 10 | 16 | 25 | 32 | 1,40:1 | 1,40:1 | 70 | 16 | 14,6 |
| p. | 179,1 med LLDPE | 80 | 64 | 0 | 8 | LLDPE 20 | 28 | 1,56:1 | 1,50:1 | (35) | | |
| q. | 179,80 med LLDPE | 80 | 64 | 0 | 8 | LLDPE 20 | 28 | 1,40:1 | 1,40:1 | 80 | 16 | 12,5 |
| r. | 255,802 | 65 | 52 | 10 | 16 | 25 | 32 | ca. 1,40:1 | ca. 1,40:1 | 80 | ca. 16 | ca. 3 |

| Sample | Weight g/sq. m. | Yield point in Newton | | Energy at break, Newton × m | | Ultimate tensile strength in Newton | | Elongation at break, % | |
|---|---|---|---|---|---|---|---|---|---|
| | | MD | CD | MD | CD | MD | CD | MD | CD |
| a. | 71 | 27 | 12 | 14,9 | 8,9 | 89 | 67 | 554 | 421 |
| b. | 82 | 36 | 26 | 15,9 | 10,1 | 85 | 55 | 563 | 538 |
| c. | 76 | 34 | 14 | 17,8 | 10,9 | 98 | 71 | 596 | 507 |
| d. | 87 | 36 | 26 | 18,0 | 13,5 | 87 | 63 | 637 | 641 |
| e. | 80 | 32 | 12 | 21,0 | 7,3 | 104 | 54 | 706 | 410 |
| f. | 98 | 39 | 28 | 17,9 | 14,7 | 84 | 65 | 636 | 686 |
| g. | 74 | 27 | 14 | 15,8 | 8,5 | 83 | 57 | 585 | 467 |
| h. | 89 | 26 | 27 | 13,3 | 7,3 | 52 | 50 | 450 | 391 |
| i. | 96 | 39 | 19 | 23,1 | 12,7 | 125 | 80 | 658 | 497 |
| j. | 120 | 42 | 33 | 26,1 | 14,1 | 114 | 78 | 756 | 533 |
| k. | 67 | 29 | 9 | 12,2 | 6,0 | 80 | 49 | 502 | 392 |
| l. | 88 | 33 | 25 | 20,5 | 12,2 | 86 | 61 | 780 | 588 |
| m. | 75 | 31 | 16 | 14,5 | 8,0 | 81 | 51 | 577 | 470 |
| n. | 79 | 31 | 19 | 19,9 | 9,9 | 98 | 54 | 699 | 543 |
| o. | 92 | 33 | 23 | 18,2 | 10,6 | 83 | 53 | 703 | 588 |
| p. | 83 | 40 | 20 | 19,8 | 11,8 | 120 | 86 | 541 | 422 |
| q. | 100 | 49 | 38 | 14,8 | 12,3 | 95 | 77 | 439 | 448 |
| r. | ca. 100 | 33 | 32 | 18,0 | 10,7 | 77 | 62 | 744 | 478 |

The layer for improved heat sealing consists of 70% "Hostalen 1022" and 30% "Nordel 1500".

The layer for improved lamination consists of 50% "Hostalen 1022" and 50% "Nordel 1500".

The extrusion temperature is 250° C. and the blow ratio 1:1.

Each of the tubular films is cut helically under an angle of 30° and two such films, each having a width of about 20 cm, are laminated and stretched with the layers for improved lamination facing one another. Initially, the lamination and simultaneous transverse stretching are effected by passing the films six or seven times through the nip between a set of grooved rollers of the type shown in British patent specification No. 1.526.722, FIG. 7. The division on each roller is 1.8 mm, the width of each tip is 0.4 mm and the tip is circularly rounded. The intermeshing between the tips is 0.9 mm. The stretching is carried out at 35° C.

Subsequently, each sample is stretched longitudinally at the same temperature by means of rollers.

Stretch ratios are determined by printed marks.

During the longitudinal stretching, the width is reduced significantly.

Those samples (as will be described below) which are subjected to heat treatment are over-stretched in the longitudinal direction and finally further stretched in the transverse direction. The aim is that the heat treated samples should end at the same stretch ratios and square meter weight as those which are not heat treated. The pleated configuration created by this last transverse stretching is maintained in the film.

Heat treatment is then carried out at various temperatures on 60 cm long and 10 cm wide specimens which are carried forward and backward over a reciprocating heated roller during a period of 120 sec. and under a tension of 300 g. Different temperatures are tried. The specimens are brought in contact with the roller while they still have the pleated configuration but the pleats gradually disappear while the material shrinks.

Samples k and l deviate from the above by being cut under an angle of 45° instead of 30°.

Samples i and j deviate in being 4-layered. The angles are as follows: +45°, +30°, −30°, −45°.

Samples p and q deviate by also being 4-layered materials, with the same directions and further by the composition of the main layer, which is:

80% "Hostalen 1022"

20% linear low density polyethylene of melt index 1.0 and a density of 0.92.

The melt index is measured according to ASTM D 1238 condition L except that the temperature is 190° C., Sample r is a 2-ply sample similar to sample f regarding composition, angles and heat-treatment temperature, but deviates by not being subjected to the last transverse stretching and therefore not being in a pleated configuration when it is brought in contact with the hot roller. It is heat treated without any essential transverse contraction, but with longitudinal contraction similar to sample f.

15 mm samples are cut in the machine and cross machine directions of each sample.

Stress-strain diagrams are taken at a velocity of 15 cm per minute and an initial ditance of 50 mm between the clamps.

Figure 2:
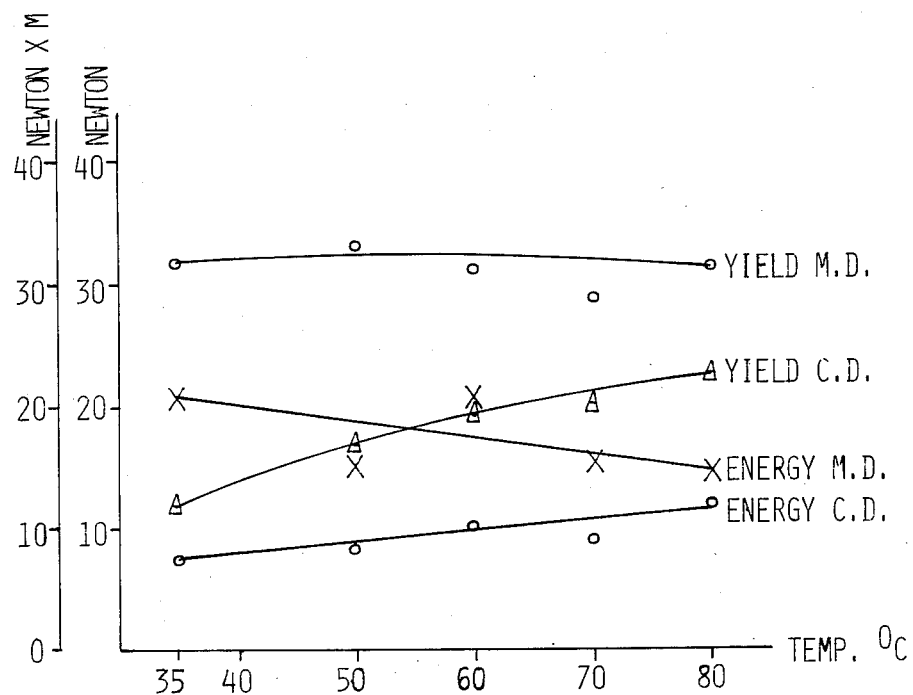
Figure 3:
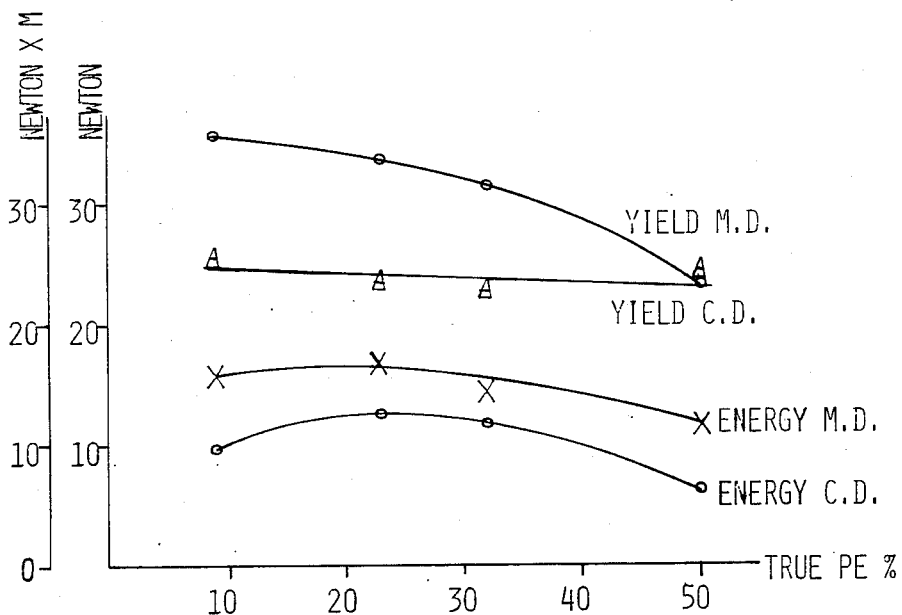
FIG. 3 is a similar diagram illustrating the effect of variations in the content of polypropylene in the laminates at a constant annealing temperature of 80° C.

The results obtained will appear from the table and from the diagrams in FIGS. 2 and 3. The diagrams in FIG. 2 compare samples e, f, m and o which all have the same composition and which are treated in the same manner, except that the annealing temperature varies.

The diagrams in FIG. 3 compare samples b, d, f and h which contain different percentages of polyethylene, but otherwise are identical, the annealing temperature of this series being 80° C. In the diagrams of FIGS. 2 and 3 the values of force and energy are corrected to a gauge of 80 g/m².

As regards the comparison between the sample r which, in essence, was not allowed to shrink transversely, and the similar sample f, which was allowed a significant shrinkage, the table shows that the shrunk film has essentially high transverse elongation at break and transverse energy absorption, while the two samples have about the same yield point in the transverse direction.

EXAMPLE 2

The procedure described in example 1 is carried out on a number of film compositions, described in table 2 below, however with the last transverse stretching step and the subsequent heat-treatment taking place in continuous manner on a pilot machine. During this stretching step, the intermeshing of the grooved rollers with each other is adjusted to obtain such a degree of pleating that there will be practically no transverse tension in the film during the heat treatment, but also so that all pleats produced by this stretching disappear due to the transverse shrinkage.

The extrusion temperature is in all cases 200° C. with a blow ratio of 1:1 and a moderate air cooling.

The high-strength laminate are in all cases made from *two* spirally cut extruded tubular films. Different angles of cutting have been tried, see table 2.

All steps of stretching are carried out at 35° C., and the heat treatment is effected on a roller heated to 80° C. The heat treatment takes about 10 seconds. The laminate is held practically tension-free while being fed in between the last pair of grooved rollers (those which immediately proceed the roller for heat treatment). This measure causes the laminate to shrink about 5-10% in the longitudinal direction during the transverse stretching between the grooved rollers. After this stretching, the laminate follows the surface of one of these rollers and is then directly transferred from this surface to the surface of the hot roller, the distance between these surfaces being only about 1 cm. This guided transfer secures that the fine pleats, produced by the stretching between the grooved rollers, remain fine and even so as to cause an even transverse contraction on the hot roller.

The latter is driven at a circumferential velocity which is about 10% lower than the circumferential velocity of the last set of grooved rollers. This measure, and a minimum tension at the take-off from the hot roller, gives the laminate a high freedom to shrink longitudinally.

When leaving the hot roller, the laminate is transferred to a cooling roller, after which it is wound up.

The longitudinal and transverse stretch ratios are measured after each step of the process by measuring the deformation of circles, which have been printed on the film before the first stretching step. The aim is a final stretch ratio (i.e. after the heat treatment) of 1.40:1 in both directions.

The adjustment of the transverse ratio takes place by the number of transverse stretching steps, which have been varied between 5 and 7 (to which comes the last one before the heat treatment). The adjustment of the longitudinal stretch ratio takes place by variation of the relative velocities of the rollers in the unit for longitudinal stretching. A proper adjustment of the stretch ratios is a complicated matter, and variations between 1.35:1 and 1.45:1 have been tolerated.

The different laminates thus produced are tested for:
(a) Elmendorf Tear Propagation Resistance according to BS 308 B (43 mm tear),
(b) Beach Puncture Resistance according to BS 4816:72,
(c) Falling Dart Impact Strength according to ASTM 1709.

Description of the Raw Materials

The melt flow index (m.f.i.) refers to ASTM D 1238 condition L (in case of polypropylenes) or condition E (in the case of polyethylenes or EPDM).
"Dowlex 2045": LLDPE of density 0.920 and m.f.i. = 1.0
"Hostalen 9255": HHMDPE of density about 0.95 and m.f.i. = about 0.05.
"Hostalen 1050": homo-PP of m.f.i. = 0.4.
"Hostalen 1022": co-PP of m.f.i. = 0.4 (further description see example 1).
"Novolen 1300 E": gas phase-polymerized PP with about 20% contents of atactic PP, partly forming a block-copolymer with the isotactic PP.
"Nordel 1500": EPDM of m.f.i. = about 0.3.
EVA: An EVA containing about 20% vinylacetate and of m.f.i. = about 5.

TABLE 2

| Film Code No. | Composition | | | Direction of ply degrees |
|---|---|---|---|---|
| | Inner layer (for improved lamination), 10% of total | Middle layer 75% of total | Outer layer (for sealing), 15% of total | |
| R402 | 70% "Dowlex 2045" 30% "Nordel 1500" | 80% "Hostalen 1022" 20% "Dowlex 2045" | 100% "Dowlex 2045" | 30 45 |
| R404 | 70% "Dowlex 2045" 30% "Nordel 1500" | 80% "Novolen 1300 E" 20% "Dowlex 2045" | 100% "Dowlex 2045" | 30 45 |
| R407 | 70% "Dowlex 2045" 30% "Nordel 1500" | 35% "Hostalen 9255" 35% "Hostalen 1022" 30% "Dowlex 2045" | 100% "Dowlex 2045" | 30 45 |
| R414 | 70% "Dowlex 2045" 30% "Nordel 1500" | 50% "Hostalen 1022" 20% "Hostalen 9255" 20% "Dowlex 2045" 10% "Nordel 1500" | 70% "Hostalen 1022" 30% "Nordel 1500" | 30 45 60 |
| R417 | 70% "Dowlex 2045" | 50% "Novolen 1300 E" | 70% "Hostalen 1022" | 30 |

TABLE 2-continued

| | | | | |
|---|---|---|---|---|
| | 30% "Nordel 1500" | 20% "Hostalen 1022" 20% "Dowlex 2045" 10% "Nordel 1500" | 30% "Nordel 1500" | 45 60 |
| R419 | 70% "Dowlex 2045" 30% "Nordel 1500" | 50% "Hostalen 1050" 20% "Hostalen 9255" 20% "Dowlex 2045" 10% "Nordel 1500" | 70% "Hostalen 1022" 30% "Nordel 1500" | 30 45 |
| R420 | 70% "Dowlex 2045" 30% "Nordel 1500" | 50% "Hostalen 1050" 20% "Hostalen 9255" 20% "Dowlex 2045" 10% "Nordel 1500" | 100% "Dowlex 2045" | 45 |
| R421 | 70% "Dowlex 2045" 30% "Nordel 1500" | 60% "Hostalen 1022" 20% "Hostalen 9255" 20% "EVA" | 100% "Dowlex 2045" | 45 |
| R422 | 70% "Dowlex 2045" 30% "Nordel 1500" | 50% "Hostalen 1022" 20% "Hostalen 9255" 20% "Dowlex 2045" 10% "Nordel 1500" | 100% "Dowlex 2045" | 45 |

Low density polyethylene (200 μm)
Ordinary sack quality film for comparison

| Film Code No. | Film weight g/sq m | Falling Dart Impact Strength grams | Elmendorf tear Strength (43 mm. tear) | | | Beach Puncture Resistance, Joules | |
|---|---|---|---|---|---|---|---|
| | | | MD | CD | 45° | MD | CD |
| R402 | 75 | 500–800 | 2160+ | 1070 | 1340 | 11.0 | 9.4 |
| | 75 | 600–800 | 1480 | 1100 | 920 | 14.2 | 13.3 |
| R404 | 71 | 600–700 | 2910+ | 1450 | 1770+ | 6.4 | 9.1 |
| | 74 | 600–800 | 2790+ | 1830 | 1280 | 9.9 | 13.8 |
| R407 | 78 | 400–700 | 1620 | 1870 | 2400+ | 11.1 | 7.0 |
| | 85 | 400–600 | 3030+ | 2110 | 2270+ | 7.9 | 7.5 |
| R414 | 79 | 600–900 | 1410 | 1430 | 2210 | 13.7 | 11.9 |
| | 73 | 600–800 | 1460 | 1400 | 990 | 11.9 | 12.4 |
| | 71 | 600–800 | 1660 | 2750+ | 1050 | 10.3 (average of MD and CD) | |
| R417 | 77 | 600–900 | 1280 | 1250 | 2040+ | 11.9 | 2.6 |
| | 82 | 800–900 | 1990 | 1460 | 750 | 13.3 | 14.0 |
| | 80 | 800–900 | 1780 | 2490+ | 650 | 12.1 | 13.6 |
| R419 | 74 | 500–700 | 1670 | 1520 | 2050 | 10.2 | 8.5 |
| | 71 | 500–800 | 2020 | 1120 | 1360 | 11.3 | 10.5 |
| R420 | 75 | 500–800 | 2450 | 1620 | 1850 | 8.7 | 7.4 |
| R421 | 77 | 700–900 | 500 | 2190+ | 800 | 12.9 | 9.9 |
| R422 | 84 | 700–900 | 2460+ | 1420 | 2160+ | 13.6 | 10.2 |
| | 184 | 500–600 | 840 | 1300 | 1700 | 5.0 (average of MD and CD) | |

+ = higher than, and indicates that one or more of the single tests exceeded the maximum of the apparatus.

Several of the samples were further tested for Emendorf Tear Propagation Strength at −15° C. For the samples of composition R 407, R 414 and R 419, this gave the same results (within the ranges of accuracy of this method) as the test results at 20° C. shown in table 2. This high performance at low temperatures is surprising in view of the high contents of polypropylene, but explicable by the microstructure, which comprises the microscopical to submicroscopical fibrils of stiff polypropylene which are almost entirely embedded in relatively soft polyethylene.

A study of the tear resistance values in relation to the lamination angles (see table 2) gives the result that the 45° laminates show a significant weakness (relatively speaking) in their 45° directions, i.e. parallel to the direction of grain in one of the layers.

The same is not true for the 30° laminates, which generally show significantly higher all-over tear values, considering that the weakest direction generally determines the value of the laminate with respect to tear propagation resistance.

An exception to the rule that the 45° laminates exhibit a relatively low tear propagation resistance along the 45° direction, is found in the composition R 407. The main layer (middle layer) of this composition consists of HMHDPE and LLPDE in combination with a PP of significantly lower molecular weight than the HMHDPE, cf. claim 18. It is believed that the improved 45° tear strength in this case is due to the advantageous effects explained in the general description in connection with this claim.

Finally, the compositions containing 100% LLDPE in the layers for sealing (i.e. R 402, 404, 407, 420, 421, 422) have been found to form an adequate seal by ultrasonic sealing. The seal resists shear forces up to about 5–6 kp/2.5 mm and peel forces up to about 2 kp/2.5 mm. In this connection it is of importance that the seal layer and the matrix in the middle layer consist of essentially the same material, namely both of a low-density polyethylene type, while the fibrillar, discontinuous, embedded phase of the middle layer consists of the much higher melting polypropylene.

EXAMPLE 3

High-strength laminates were produced from two compositions, both entirely consisting of HMHDPE and LLDPE, except for minor amounts of EPDM in the layer for improved lamination. The procedure was identical to that explained in example 2, except that a prototype machine for full technical scale operation was used.

In both cases, the extrusion temperature was 240° C., the angle of cutting 45°, the temperature of stretching 35° C., the temperature of the rollers for heat treatment 80° C., the time of heat treatment about 10 sec. Two heated rollers were used, one after the other, and subsequently two cooling rollers. The final stretch ratio, measured after heat treatment, was about 1.4:1 in both directions.

The entire stretching/lamination process including the heat treatment was operated in-line, the line comprising five transverse stretching stations, one longitudinal stretching station, and the last stretching station supplying the laminate with pleats for the "free-shrinkage" heat treatment. Between the last pair of grooved rollers and the first roller for heat treatment, and in close proximity to both, was an idle roller serving to keep the pleats fine and even.

The transverse stretching ratio was controlled by adjustment of the intermeshing between the grooved rollers in each of the first five pairs of grooved rollers. As in example 2, the intermeshing between the last pair of grooved rollers was adjusted to minimize the transverse tension during the heat treatment.

tion at break (in %) and ultimate tensile tension (in Newton/mm$^2$) were determined only at the velocity 150 mm/min.

The laminate prepared from composition R 1 was further converted to open-mouth sacks on commercial sack-making machinery. It was first folded to a flat tube while being side-seamed by use of a commercial hot-melt adhesive, then cut into lengths while being heat-sealed transversely to form the bottom of the sack. This seam was made by simple impulse sealing (without any kind of folding or overtaping) but with the conditions of sealing optimized to allow maximum shrinkage in the longitudinal direction. The dimension of the sack was about 100 cm×50 cm. About 30 of such sacks were filled, closed by overtaping and drop-tested at minus 20° C. in competition with sacks of similar size made from a 185 g/sq m low density polyethylene film of standard quality for sack production. By these tests the high-strength laminate was found to be clearly superior in spite of its much lower gauge. The weight of the high-strength laminate used for these bag tests was 80 g/sq m, in other words almost 2½ times as light as the ordinary polyethylene sack material.

TABLE 3

| Film Code No. | Composition | | | Film weight g/sq m | Elmendorf Tear Strength (43 mm tear) | | |
|---|---|---|---|---|---|---|---|
| | Inner layer (for improved lamination) 10% of total | Middle layer 75% of total | Outer layer (for improved sealing) 15% of total | | MD | CD | 45° |
| R1 | 70% "Dowlex 2045" 30% "Nordel 1500" | 50% "Hostalen 9255" 50% "Dowlex 2045" | 100% "Dowlex 2045" | 74 | 2020+ | 2360+ | 1350 |
| R2 | 70% "Dowlex 2045" 30% "Nordel 1500" | 70% "Hostalen 9255" 30% "Dowlex 2045" | 100% "Dowlex 2045" | 73 | 3200+ | 3000+ | 2220+ |

| Film Code No. | Beach Puncture Resistance, Joules | | | Yield point tension N/mm$^2$ | | | Ultimate Tensile Tension N/mm$^2$ | | | Elongation at break % | | |
|---|---|---|---|---|---|---|---|---|---|---|---|---|
| | MD | CD | 45° | MD | CD | 45° | MD | CD | 45° | MD | CD | 45° |
| R1 | 10,4 | 13,1 | 12,2 | 150 mm/min. 19,5 15 mm/min. 16,2 | 150 mm/min. 19,3 15 mm/min. 17,3 | 150 mm/min. 20,3 15 mm/min. 17,3 | 51,8 | 43,9 | 30,0 | 603 | 536 | 408 |
| R2 | 4,5 | 6,3 | 6,7 | 150 mm/min. 20,3 15 mm/min. 17,8 | 150 mm/min. 19,7 15 mm/min. 18,1 | 150 mm/min. 21,6 15 mm/min. 18,8 | 49,7 | 48,5 | 26,9 | 536 | 540 | 324 |

+ = higher than, and indicates that one or more of the single tests exceeded the maximum of the apparatus.

The lineary velocity of the laminate at the exit from the stretching/lamination line was about 30 m/min.

The composition of the films and the results of the laboratory testing appear from table 3.

The polymer designations and the test methods for impact, tear and puncture resistance are explained in example 2 above. The other mechanical properties were determined from strain/stress curves taken for 15 mm wide specimens, the initial distance between the draw-clambs being 50 mm.

Strain/stress curves were taken as a modestly low velocity, namely 150 mm/min. and at a very low velocity, namely 15 mm/min. The latter was tried in order to study the creep strength.

The yield tension (in Newton/mm$^2$) therefore was determined at each of the two velocities, while elonga-

I claim:

1. In a method of preparing a high strength sheet material comprising forming a laminate comprising at least two layers of a thermoplastic polymer material, each layer having a fibrillar grain structure providing a predominant direction of splittability in each said layer, the layers being bonded to one another with the said predominant directions of splittability generally transverse to each other, and biaxially orienting the molecules of said layers by stretching the layers in separate substantially uniaxial steps, the transverse stretching being effected by applying pressure to the surface of the laminate along plural lines extending substantially in the longitudinal direction of the laminate to deflect the same into a transversely sinuous configuration, the improvement comprising subjecting the biaxially oriented laminate to a heat treatment while allowing at least 7% shrinkage of the laminate to take place in at least its transverse direction, said laminate being introduced to said heat treatment while in said sinuous configuration with the crest on one side of said configuration being heated more rapidly than the remainder of said laminate.

2. A method as in claim 1, wherein said heat treatment is effected by contacting a longitudinally pleated laminate with the surface of a hot body which surface is flat in the transverse direction.

3. A method as in claim 2, wherein said heated body is a hot roller.

4. A method as in claim 3, wherein air bubbles entrapped between the laminate and the surface of the hot roller are removed by squeezing while allowing the laminate to slide along the surface of the hot roller.

5. A method as in claim 4, wherein the laminate is subjected to vibrations in short intervals during which the laminate is forced against the surface of the hot roller.

6. A method as in claim 2, wherein said laminate is introduced onto said heated body in the configuration obtained during the last transverse stretching step.

7. A method according to claim 6, wherein said laminate is allowed to contract longitudinally during said last transverse stretching step.

8. An apparatus for carrying out the method according to claim 1, comprising means for forming a laminate and means for stretching said laminate longitudinally and transversely in separate substantially uniaxial steps, the means for transversely stretching the laminate comprising means for applying pressure to the surface of the laminate along plural lines extending substantially in the longitudinal direction of the laminate to impart thereto a sinuous configuration, and further comprising means for heat treating the biaxially oriented laminate while in said sinuous configuration while allowing a shrinkage of the laminate to take place in at least its transverse direction, said heat treating means heating the crests on one side of said sinuous configuration more rapidly than the remainder of the laminate.

9. An apparatus according to claim 8, wherein said heat treating means comprise at least one heated roller and that it further comprises means for introducing a longitudinally pleated laminate onto said heated roller.

10. An apparatus according to claim 9, wherein the means for transversely stretching the laminate comprise at least one pair of intermeshing grooved rollers, said heated roller being placed in close proximity of the surface of one of the roller of said pair of intermeshing grooved rollers to allow the laminate to be contacted with the surface of said heated roller immediately after having left the surface of said roller of the pair of intermeshing grooved rollers and while retaining said sinuous configuration.

11. An apparatus according to claim 9, wherein the means for transversely stretching the laminate comprise at least one pair of intermeshing grooved rollers, and including at least one conveyor roller arranged between the last pair of intermeshing grooved rollers and said heated roller, the adjacent rollers in said arrangement being in such close proximity to one another that the film is supported by a roller surface during substantially the entirety or its travel after it has left the grooved roller surface to the heated roller.

12. An apparatus as in claim 9, further comprising a counter roller located adjacent to the hot roller and cooperating with said hot roller to remove air bubbles entrapped between the laminate and the surface of the hot roller by squeezing while allowing the laminate to slide along the surface of the hot roller.

13. An apparatus as in claim 12, further comprising means for vibrating said counter roller relative to said hot roller.

14. A method of preparing a high strength sheet material comprising forming a laminate comprising at least two layers of a thermoplastic polymer material, each layer having a fibrillar grain structure providing a predominant direction of splittability for that layer, the layers being bonded to one another with said predominant directions of splittability generally transverse of each other, and biaxially orienting the molecules of said layers by stretching the layers in separate substantially uniaxial steps, wherein the thermoplastic polymer material consists essentially of a blend of 40-85% by weight of polypropylene and 60-15% by weight of a lower melting or amorphous admixture which (a) mainly consists of polyethylene or the copolymers thereof, (b) exhibits substantially the same or a higher elongation at break than said polypropylene when tested at room temperature under slow stretching, (c) has a modulus of elasticity which at room temperature is equal to or lower than that of a blend of 90% polyethylene of a density of 0.95 and 10% EPR containing 25% ethylene and 75% propylene, and wherein at least the last 25% of the biaxial stretching, measured in terms of the increase in area from said stretching, is carried out below 50° C., and including the subsequent step of heat treating the biaxially oriented laminate at a temperature higher than 50° C., but below the softening temperature of the laminate.

15. A method according to claim 14, wherein the sheet is allowed to shrink at least 7% in at least one direction.

16. A method as in claim 14, wherein the stretch ratio in any direction and determined after shrinkage does not exceed 2.5:1.

17. A method according to claim 14, wherein said polyethylene is so selected that its shrinkability at 100° C., in the oriented state, is higher than the corresponding shrinkability of the polypropylene.

18. A method according to claim 14, comprising admixing, as an alloying agent between the polypropylene and the polyethylene, minor amounts of a branched polypropylene, and a polyolefin with 4 or more carbon atoms.

19. A method as in claim 14, wherein the admixture comprises as its major component linear polyethylene.

20. A method as in claim 19, wherein the linear polyethylene is high density polyethylene of a melt flow index according to ASTM D 1238 condition E not exceeding 0.2 and said blend further comprises between 10 and 50% of a softening component.

21. A method as in claim 14, wherein the linear polyethylene is linear low density polyethylene.

22. A method as in claim 21, wherein the melt flow index of said linear low density polyethylene according to ASTM D 1238 condition E does not exceed 3.

23. In a method of preparing a generally continuous and coherent high strength sheet material comprising forming a laminate comprising at least two continuous layers of a thermoplastic polymer material, each layer having a fibrillar grain constituted by substantially discrete micro fibrils of a generally crystalline polymer embedded in dispersed relation in a relatively less crystalline polymer matrix which fibrils have generally a common direction so as to impart to each such layer a predominant direction of splittability, the layers being bonded to one another with said predominant directions of splittability generally transverse to each other, and stretching the layers in substantially uniaxial steps while maintaining their continuity to thereby biaxially orient the molecules of said layers, the improvement wherein the direction of splittability in each layer of said layers of the laminate to be biaxially oriented forms an angle of between 10° and 50° with the machine direction of the laminate.

24. A method as in claim 23, wherein the stretch ratio in any direction and determined after shrinkage does not exceed 2.5:1.

25. In a method of preparing a high strength sheet material comprising forming a laminate comprising at least two continuous layers of a thermoplastic polymer blend comprising polyethylene, each layer having a fibrillar grain structure providing a predominant direction of splittability in said layer, the layers being bonded to one another with the said predominant directions of splittability generally transverse to each other, and biaxially orienting the molecules of said layers by stretching the layers in separate substantially uniaxial steps to convert the grain of polymer into a zig-zagging micropattern, the improvement wherein said blend is composed of high molecular weight high density polyethylene and low density polyethylene having a significantly lower molecular weight, said low density polyethylene being selected from the group consisting of copolymers and branched polyethylenes which (a) exhibit substantially the same or higher elongation at break than said high molecular weight high density polyethylene when tested at room temperature under slow stretching, and (b) are capable of distinctly segregating, while forming a distinct microphase, from said high molecular weight high density polyethylene on cooling of a molten homogeneous blend of said components.

26. A method according to claim 25, wherein the sheet is allowed to shrink at least 7% in at least one direction.

27. A method according to claim 25, wherein the stretch ratio in any direction and determined after shrinkage does not exceed 2.5:1.

28. A method according to claim 25, wherein said blend further contains polypropylene of a molecular weight significantly lower than that of said high molecular weight high density polyethylene.

29. A method according to claim 28, wherein said blend further contains minor amounts of an alloying agent.

30. A method of preparing a high strength sheet material comprising forming a laminate from at least two separately extruded films of thermoplastic polymer material, each film having (a) a main layer exhibiting a fibrillar grain structure providing a predominant direction of splittability in each said film, and (b) a second layer for controlling bonding strength, the films being bonded to one another with the said predominant directions of splittability generally transverse to each other, the second layer of one film facing the second layer of the next adjacent film, and biaxially orienting the molecules of said layers by stretching the layers in separate substantially uniaxial steps, the transverse stretching and the bonding being effected by applying pressure to the surface of the laminate along lines extending substantially in the longitudinal direction of the laminate to impart thereto a sinuous configuration, and in which main layers the fibrillar grain structure consists of micro fibrils of a polymer selected from highly crystalline polypropylene and high density polyethylene which micro fibrils are generally embedded in a matrix material predominantly consisting of low density polyethylene, wherein (a) said matrix material exhibits an elongation at break at least about equal to that of the microfibrilforming polymer when tested at room temperature under slow stretch, and (b) said second layers mainly consist of branched polyethylene and exhibit a heat-seal temperature higher than 100° C. and an elongation at break at least about equal to that of the micro-fibril-forming polymer.

31. A method according to claim 30, wherein said laminate is heat treated below the temperature at which the second layers heat-seal to each other.

32. A method according to claim 30, wherein said matrix material of said main layers has a melting range lower than that of said second layers and the laminate is allowed to shrink, at least in one direction, during said heat treatment.

* * * * *

UNITED STATES PATENT AND TRADEMARK OFFICE
CERTIFICATE OF CORRECTION

PATENT NO.  :  4,629,525
DATED       :  December 16, 1986
INVENTOR(S) :  Ole-Bendt Rasmussen It is certified that error appears in the above-identified patent and that said Letters Patent is hereby corrected as shown below:

In the Claims:

Claim 23, second to the last line, "50°" should read -- 35° --.

Signed and Sealed this

Fifth Day of January, 1988

*Attest:*

DONALD J. QUIGG

*Attesting Officer*   *Commissioner of Patents and Trademarks*